United States Patent
Beck et al.

(10) Patent No.: US 11,858,080 B2
(45) Date of Patent: Jan. 2, 2024

(54) CHANGING DEVICE FOR ROTARY INDEXING TABLES

(71) Applicant: SAUTER FEINMECHANIK GMBH, Metzingen (DE)

(72) Inventors: Matthias Beck, Metzingen (DE); Markus Ludwig, Kirchentellinsfurt (DE)

(73) Assignee: KOLIBRI BETEILIGUNGSGESELLSCHAFT MBH & CO. KGAA, Kleinmachnow (DE)

( * ) Notice: Subject to any disclaimer, the term of this patent is extended or adjusted under 35 U.S.C. 154(b) by 0 days.

(21) Appl. No.: 17/263,652

(22) PCT Filed: Jul. 31, 2019

(86) PCT No.: PCT/EP2019/070606
§ 371 (c)(1),
(2) Date: Jan. 27, 2021

(87) PCT Pub. No.: WO2020/030492
PCT Pub. Date: Feb. 13, 2020

(65) Prior Publication Data
US 2021/0283737 A1    Sep. 16, 2021

(30) Foreign Application Priority Data

Aug. 10, 2018   (DE) ...................... 10 2018 006 306.3

(51) Int. Cl.
*B23Q 16/10*   (2006.01)
(52) U.S. Cl.
CPC ...... *B23Q 16/105* (2013.01); *B23Q 2220/004* (2013.01)

(58) Field of Classification Search
CPC ................... B23Q 16/105; B23Q 2220/004
See application file for complete search history.

(56) References Cited

U.S. PATENT DOCUMENTS 3,277,789 A * 10/1966 Graham ............... B23Q 16/065
                                                      409/164
3,824,877 A * 7/1974 Mazue ................. B23Q 16/065
                                                       74/820

(Continued)

FOREIGN PATENT DOCUMENTS

CN        105014480         11/2015
CN        106552967 A   *   4/2017    ............... B23Q 5/10

(Continued)

OTHER PUBLICATIONS

Machine translation of KR 20170037162 A, obtained from fit database (Year: 2017).*

(Continued)

*Primary Examiner* — Thomas C Diaz
(74) *Attorney, Agent, or Firm* — WENDEROTH, LIND & PONACK, L.L.P.

(57) ABSTRACT

A changing device for rotary indexing tables has a stand component (12) used as a base component. Through the stand component (12) a shaft (18) passes defining the axis of rotation of tables (2) rotatable by an electric motor which having an interface (20) for coupling concerned tables (2). Tables 2 can be fixed in predeterminable rotational positions relative to a table unit (8) by a clamping device (60). At least two table units (8), differing from each other at least with respect to their clamping devices (60), together with their assigned table (2) as exchange components can be fixed in an interchangeable manner on the base component for their operation.

18 Claims, 2 Drawing Sheets

(56) References Cited

U.S. PATENT DOCUMENTS

| | | | |
|---|---|---|---|
| 2010/0275726 A1* | 11/2010 | Tatsuda | ................. B23Q 1/287 |
| | | | 74/813 R |
| 2016/0207156 A1 | 7/2016 | Xia | |
| 2017/0239770 A1 | 8/2017 | Tachiki | |

FOREIGN PATENT DOCUMENTS

| | | | | |
|---|---|---|---|---|
| DE | 33 22 752 | | 1/1985 | |
| DE | 199 34 291 | | 2/2000 | |
| DE | 20 2009 012 509 | | 2/2010 | |
| DE | 10 2006 021 344 | | 5/2012 | |
| DE | 10 2016 100 230 | | 7/2016 | |
| DE | 103 51 694 | | 1/2017 | |
| DE | 10 2017 101 903 | | 8/2017 | |
| EP | 1262278 A1 * | | 12/2002 | ........... B23Q 1/0009 |
| EP | 2 233 244 | | 9/2010 | |
| KR | 100806043 B1 * | | 2/2008 | ............. B23Q 16/10 |
| KR | 20170037162 A * | | 4/2017 | ............. B23Q 16/10 |

OTHER PUBLICATIONS

International Search Report (ISR) dated Nov. 11, 2019 in International (PCT) Application No. PCT/EP2019/070606.

* cited by examiner

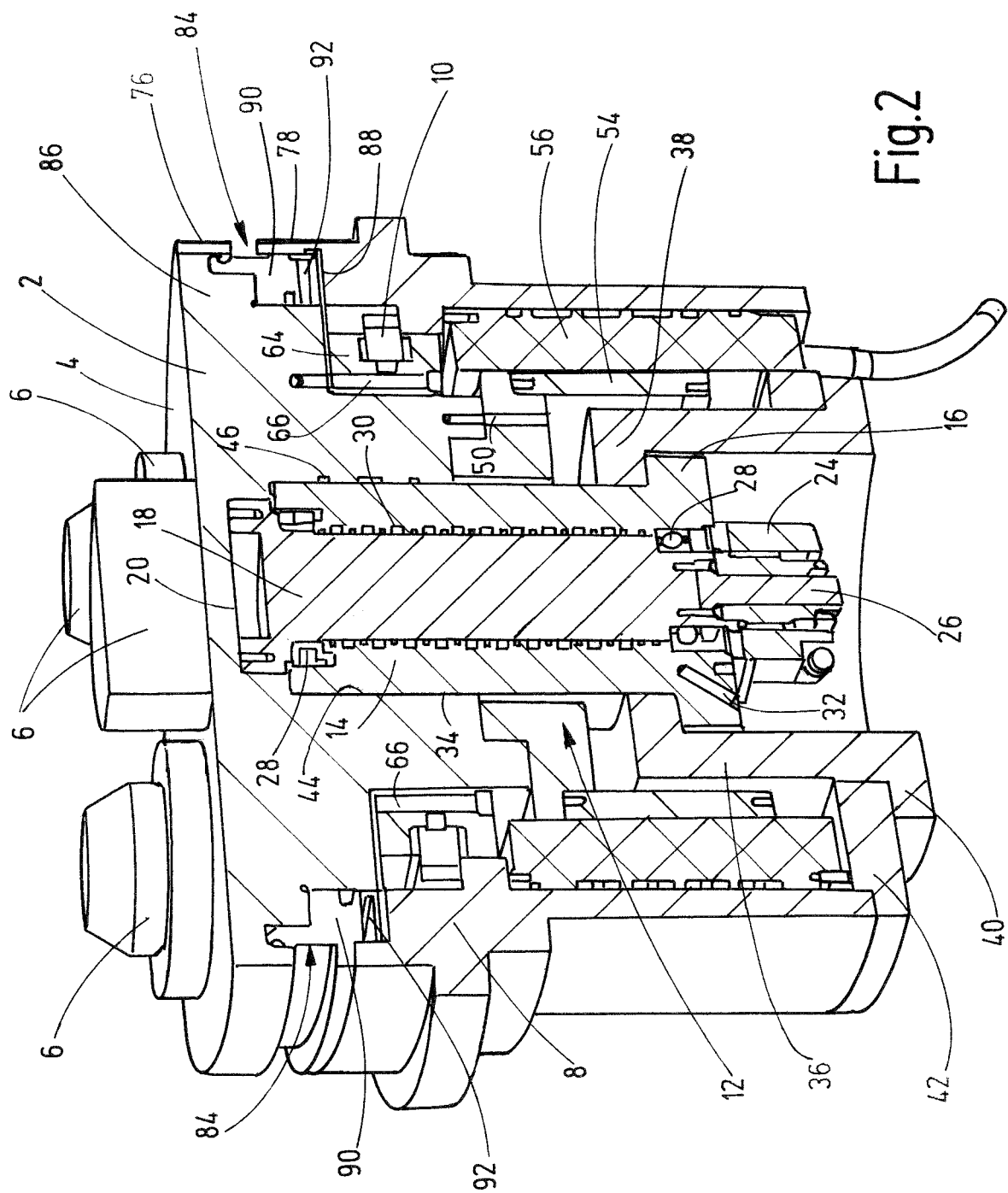

CHANGING DEVICE FOR ROTARY INDEXING TABLES

FIELD OF THE INVENTION

The invention relates to a changing device for rotary indexing tables, having a stand component, which is used as a base component and through which a shaft passes. The shaft defines the axis of rotation of tables rotatable by an electric motor and has an interface for coupling concerned tables. The tables can be fixed in predeterminable rotational positions relative to a respective assigned table unit by a clamping device.

BACKGROUND OF THE INVENTION

To ensure an exact machining of workpieces, arranged on rotary indexing tables, it is not only required to position the rotary indexing table precisely in the concerned rotary positions. In order to achieve a high machining quality, it is also essential to firmly fix the rotary indexing table in the selected rotary positions. As shown by way of example in DE 103 51 694 C5, it is state of the art in this respect to provide a clamping device by which, by supplying a hydraulic pressure medium, a clamping force can be generated. The clamping force establishes a frictional engagement between the table and the stationary, assigned table unit. In the industrial use of rotary indexing tables, different requirements result for the construction of the table unit depending on the various machining tasks, the different types of workpieces to be machined on the rotary indexing table and the type of tools used for this purpose. These requirements often also apply to the constructive formation of the clamping device, which, depending on the intended use, for instance has to meet different demands with regard to the amount of holding torque. To meet changing demands, table units and stand components of various construction are often used alternately for tables of the same size class. Such changing operations, which are adapted to the area of application, represent a considerable cost factor while operating of rotary indexing tables.

SUMMARY OF THE INVENTION

Based on this problem, the invention addresses the object of providing a changing device permitting an efficient and more cost-effective operation of rotary indexing tables.

According to the invention, this object is basically achieved by a changing device having, as a solution of this problem, a changing device of the genus mentioned above, in which at least two table units, differing from each other at least with respect to their clamping devices, together with their assigned table as exchange components can be fixed in an interchangeable manner on the base component for their operation. Because table units of different types are conceived as exchange components, that can be coupled to the stand component via the interface of the shaft of the stand component, required changing operations are limited to the exchange of the respective table unit together with its table. By one and the same stand component as the base component, rotary indexing tables of different construction, for instance with regard to their clamping device, can be operated in this way. Accordingly, a cost-effective operation of rotary indexing tables can be achieved.

In advantageous exemplary embodiments, at one free end of the shaft, and at least partially enclosed by the stand component, an incremental encoder or an absolute encoder, hereinafter referred to as a rotary encoder, is arranged. At the other free end of the shaft, the interface for the respective table of a table unit is arranged. The rotary encoder for the rotary position of the table can be formed for high-precision rotary positioning by a rotary encoder as is marketed by the company Dr. Johannes Heidenhaim GmbH, D 83301 Traunreut, Germany. Because in the device according to the invention the same stand component continues to be used across changing operations, for high-precision rotary positioning such a relatively expensive component can be used for changing operations without any substantial increase in the cost.

Advantageously, the coil winding of an electric motor for driving the respective table is accommodated in the table unit.

In advantageous exemplary embodiments, the cylindrical outer circumference of the stand component forms a guide surface, along which the differently formed table units can be placed as exchange units. Changing operations can therefore be performed using little assembly effort.

With regard to the different construction of the table units, the arrangement can advantageously be made such that the respective clamping device can be at least partially hydraulically operated. The one type of clamping device between the table and the assigned table unit establishes the frictional engagement between the rotating table and the table unit arranged stationarily on the stand component by hydraulic spreading. The other type of clamping device is provided with a lamellar frictional engagement device.

In advantageous exemplary embodiments, the stand component is divided into two parts, having a rotary guide for the shaft and a foot part. The foot part flange-shaped and widens radially outwards in relation to the rotary guide. One the foot part, the table unit together with the respective type of clamping device is placed in a stationary manner.

Advantageously, a coaxial hollow cylinder can adjoin to the foot part of the stand component and encompasses the rotary encoder.

Particularly favorable manufacturing and operating costs can be achieved if the stand component always has the same predeterminable size for all sizes of tables and table units and irrespective of the type of clamping device used in the individual case.

The respective rotatable table can be flush with the outer circumference of the assigned table unit or, in contrast, be offset radially inwards.

In particularly advantageous exemplary embodiments, on part of the stand component, at least one rotary seal extends between the rotary guide of the stand component and the shaft. The rotary seal is interrupted by lubrication grooves. With particular advantage, a seal made of Zurcon (material name by Trelleborg; based on polyurethane) can be used here. Lubricating fluid, supplied from a supply point, is distributed along the axial length of the rotary guide via the lubricating grooves. Furthermore, a variant having gap seals and bearings can be used instead of contact seals to be able to achieve higher rotary speeds.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
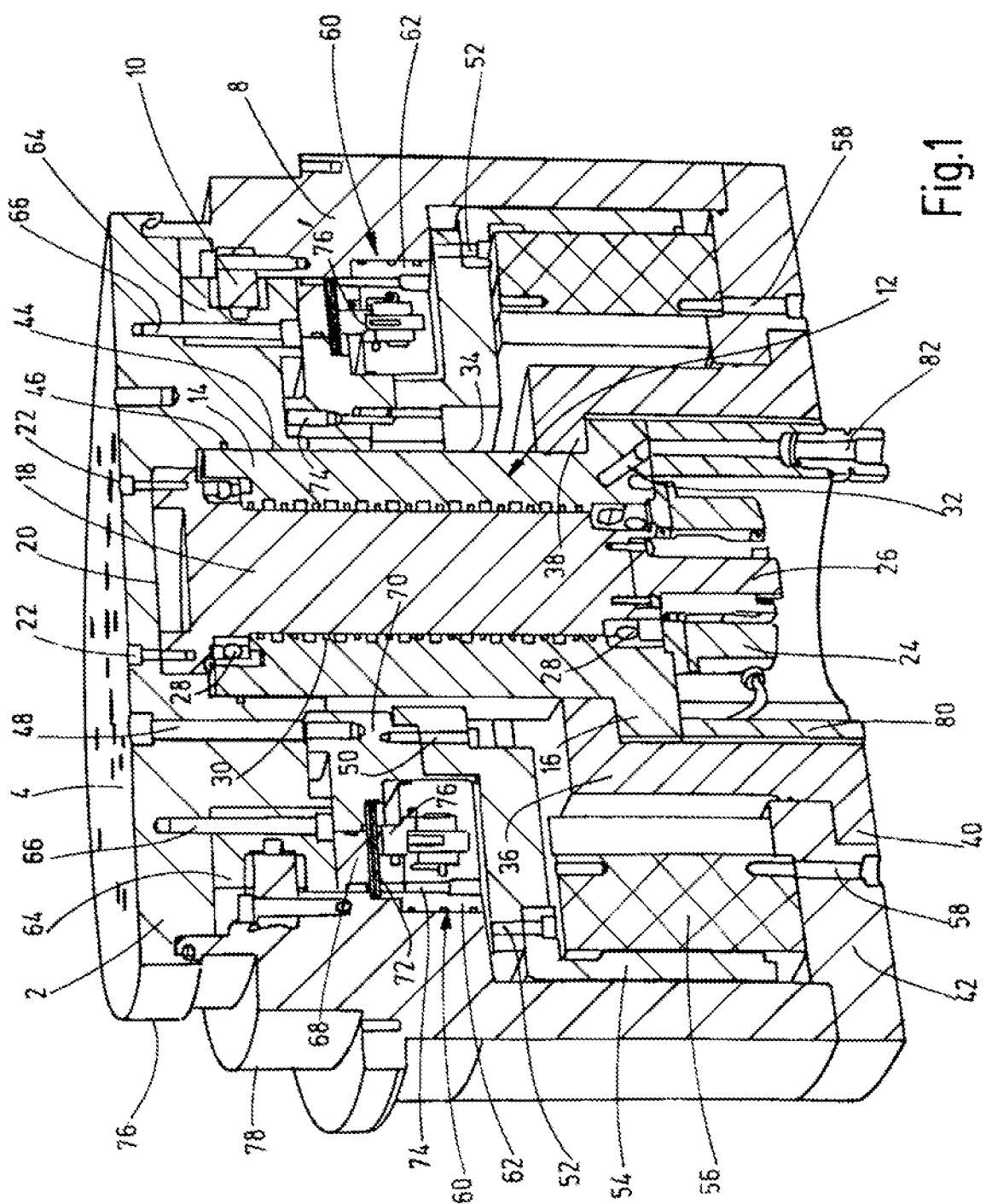
FIG. 1 is a schematically simplified, perspective view, in section along a central vertical plane, of a changing device according to a first exemplary embodiment of the invention, and FIG. 2 a schematically simplified perspective view in section of a changing device according to a second exemplary embodiment of invention.

In the figures, a table 2 has a circular, planar table surface 4, as is common for rotary indexing tables. In the first exemplary embodiment of FIG. 1, the table surface 4 is shown without any parts, such as workpieces or the like, mounted thereon. In the second exemplary embodiment of FIG. 2, exemplary pieces of equipment 6 are shown on the table surface 4. In both exemplary embodiments of FIG. 1 and FIG. 2, the table 2 forms a structural unit with an assigned stationary table unit 8, on which the table 2 is rotatably mounted by a bearing 10 formed by a roller bearing unit of the standard type. In both exemplary embodiments, the table unit 8 forms a type of outer housing having mainly circular cylindrical outer wall parts. The structural unit, comprising the table 2 and the table unit 8, forms an exchange component which, although it may be of different construction, can be fixed to one and the same base component in the form of a stand component 12.

In this respect, FIGS. 1 and 2 show different constructions for the table 2 together with the table unit 8, which differ mainly in the type of clamping between the table 2 and the table unit 8. The stand component 12 has a circular cylindrical hollow body 14. At its bottom end in the figures, the hollow body 14 has a foot part 16, which has the form of a flange that widens or extends radially outwards. The hollow body 14 forms the rotary guide for a shaft 18, which defines the axis of rotation for the table 2. The upper end of shaft 18 forms an interface 20, with which the exchange component can be coupled. In this example, as FIG. 1 shows, for this purpose bolts 22 are provided for a bolted connection to the table 2 at the bottom of the table surface 4.

A rotary encoder 24 is arranged at the bottom of the foot part 16 and interacts with an extension 26 of the shaft 18 to determine its rotational position, and thus, the rotational position of the table 2. In the rotary guide, formed by the hollow body 14 and in which the shaft 18 is guidably supported with and without roller bearings 28, there is a rotary distributor for lubricating fluid and other media, which are beneficial to the seal. The rotary distributor has, along the outside of the shaft 18 between the rolling bearings 28, a rotary seal 30, in this case a Zurcon seal, which is interrupted by supply grooves. Furthermore, a variant having gap seals and bearing instead of contact seals can be used. Starting from a feed point (not shown), to which the lubricant or other medium is routed via a supply line 32, the lubricant or other medium is distributed along the seal 30 via the lubrication grooves and/or supply grooves. The circular cylindrical outer circumference of the hollow body 14 of the stand component 12 forms a guide surface 34, along which the table unit 8 together with the assigned table 2 as an exchange component can be put on the base component formed by the stand component 12. As shown in FIG. 1, in the mounted position, an inner collar 38, projecting radially inwards, of an inner housing part 36 of the table unit 8 rests against the top surface of the flange-shaped base part 16 of the stand component 12. An end sided outer flange 40 of the inner housing part 36 forms the support for a bottom part 42 of the outer housing formed by the table unit 8. An inner circumferential surface of the table 2 is guided, sealed by a sealing ring 46, at the upper end area of the guide surface 34 of the hollow cylinder 14.

Bolts 48, 50 and 52 are used to connect the table 2 to a shell part 54, which as an outer rotor encompasses a coil winding 56, which is fixed to the housing bottom part 42 using bolts 58. Also feasible with an internal rotor. This arrangement forms the electric drive motor of the table 2. The main difference between the exchange component shown in FIG. 1 and the exchange component shown in FIG. 2 is the construction of the clamping device.

In the example of FIG. 1, a plurality of equally formed clamping units 60 are arranged at equal distances from each other on a circular line concentric to the shaft 18. Two clamping units 60 are visible in FIG. 1. Every clamping unit 60 has a stationary device body 62 attached to the inner wall of the housing shell formed by the table unit 8. More specifically, the device body 62 is located in an area below the inner bearing part 64 of the bearing 10, which is fixed to the underside of the table surface 4 using bolts 66. In the area between the underside of the inner bearing part 64 and the device body 62 there are, from top to bottom, a stationary compression ring 68 connected to the table unit 8, an intermediate ring 70 and a lamellar pack 72. The intermediate ring 70, which is connected to the table 2 by the bolts 48, can be rotated relative to the stationary compression ring 68.

The lamellar pack 72 is formed by a stacked sequence of disks in the manner of clutch plates. The pack 72 comprises a succession of stationary lamellas, connected to the stationary compression ring 68 by bolts 74, and comprises movable lamellas, connected to the movable intermediate ring 70 by bolts not shown. Every device body 62 has a hydraulically actuated piston 76. The end face of piston 76a can be used to load and press the lamellar pack 72 against the compression ring 68 and the intermediate ring 70, establishing a frictional engagement between the lamellas, by which the compression ring 68 and the intermediate ring 70 are fixed non-rotatable to each other.

In FIG. 2, components that functionally match those of the example of FIG. 1 are designated by the same reference numerals as in FIG. 1. In the example of FIG. 1 the circumferential surface 76 of the table 2 is set back radially inwards relative to the outer circumference 78 of the table unit 8. In the example of FIG. 2 the circumferential I surface 76 of the table 2 and the outer circumference 78 of the table unit 8 are radially flush with each other. In the example of FIG. 1, a coaxial hollow cylinder 80 is provided at the underside of the foot part 16, with the hollow cylinder 80 encompassing the rotary encoder 24 and with hollow cylinder 80 having the port 82 for the lubricant supply or media supply to the conduit 32. In the FIG. 2 example, this hollow cylinder 80 is omitted as an optional component in the example of FIG. 2.

In all other respects, however, the stand component 12 fully matches that of the example of FIG. 1 as far as its function as a base component, on which exchange components comprising the table 2 together with the table unit 8 of different constructions can be placed, is concerned. The difference is mainly in the arrangement and construction of the clamping device, the position of the bearing 10 below the clamping device and the construction of the electric motor, for which the shell part 62, connected to the table 2, is not arranged as an outer rotor on the outside of the coil winding 56, but as an inner rotor on the inside of the coil winding 56.

The clamping units 84, which are hydraulically actuated like the clamping units 60 of FIG. 1, are arranged between a circumferential area 86 of the table 2, adjacent to the table surface 4, and a clamping surface 88, extending in a radial plane and formed by an end surface in a recess in the outer wall of the housing of the table unit 8. The clamping units 84 comprise a spreader body 90 having an internal pressure chamber 92. By supplying pressure to the pressure chamber 92, the spreader body 90 can be hydraulically spread and generates a clamping force acting between the circumferential area 86 of the table 2 and the stationary clamping surface 88 on the table unit 8 to form a frictional connection for fixing the relative rotational position. As shown in FIG. 2, the bearing 10 is arranged below the clamping units 84. In FIG. 1, the inner bearing part 64 is fixed to the table 2 using bolts 66.

While various embodiments have been chosen to illustrate the invention, it will be understood by those skilled in the art that various changes and modifications can be made therein without departing from the scope of the invention as defined in the claims.

The invention claimed is:

1. A changing device kit for rotary indexing tables, the changing kit comprising:
    first and second indexing tables being mounted and rotatable on top ends of first and second table units, respectively, and having first and second shafts extending from the first and second indexing tables, respectively, the first and second table units having first and second outer housings, respectively;
    first and second clamps being in the first and second table units and fixing the first and second indexing tables in predeterminable rotational positions relative to the first and second table units, respectively;
    a stand component forming a bottom base component having a cylindrical hollow body and a coaxial hollow cylinder extending from the cylindrical hollow body, the cylindrical hollow body, receiving and forming a rotary guide for the first and second shafts and defining an axis of rotation for the first and second indexing tables, respectively, relative to the stand component and the first and second table units, respectively, first and second combinations being formed of the first indexing table and first table unit and being formed of the second indexing table and the second table unit, respectively, the first and second combinations being selectively and releasably mounted on the stand component such that the outer housings of the table units mounted on the stand component laterally surrounds an entire axial length of the cylindrical hollow body and the hollow cylinder; and
    a foot part of the cylindrical hollow body adjoining and releasably engaging an inner collar of an inner housing part in the first and second outer housings, respectively.

2. A changing device kit according to claim 1 wherein the first and second clamps are different.

3. A changing device kit according to claim 1 wherein the stand component comprises a cylindrical outer circumference forming a guide surface along which the first and second table units are placed.

4. A changing device kit according to claim 1 wherein the first and second clamps are hydraulically operable.

5. A changing device kit according to claim 1 wherein the first and second indexing tables are frictionally engaged with the first and second the tables units by the first and second clamps, respectively.

6. A changing device kit according to claim 1 wherein the inner housing part of the first and second outer housings, respectively, surrounds the coaxial hollow cylinder.

7. A changing device kit according to claim 1 wherein the foot part extends axially between the inner collar of the first and second outer housings, respectively, and the coaxial hollow cylinder.

8. A changing device kit according to claim 1 wherein the coaxial hollow cylinder has a media supply port extending axially through a wall of the coaxial hollow cylinder.

9. A changing device kit according to claim 1 wherein the rotary guide comprises the cylindrical hollow body with the foot part extending radially outwardly from an end of the cylindrical hollow body remote from the respective indexing table.

10. A changing device kit according to claim 1 wherein a foot part being flange-shaped and widening radially outwardly relative to the rotary guide, the respective table unit with the respective indexing table being placed stationary on the foot part.

11. A changing device kit according to claim 1 wherein a rotary encoder arranged at a first free end of the first and second shafts, respectively, and at least partially enclosed by the stand component, the coaxial hollow cylinder encompassing the rotary encoder.

12. A changing device kit according to claim 1 wherein each of the first and second clamps comprises a lamellar pack.

13. A changing device kit according to claim 1 wherein each of the first and second clamps comprises a clamping surface formed by an end surface in a radial outer wall of a recess in the respective outer housing of the respective table unit.

14. A changing device kit for rotary indexing tables, the changing kit comprising:
    first and second indexing tables being mounted and rotatable on first and second table units, respectively, the first and second table units having first and second outer housings, respectively;
    first and second clamps being in the first and second table units and fixing the first and second indexing tables in predeterminable rotational positions relative to the first and second table units, respectively, each of the first and second clamps having a clamping surface formed by an end surface in a radial outer wall of a recess in the respective outer housing of the respective table unit;

a stand component forming a bottom base component with a shaft being connected to the respective indexing table, extending through the stand component, and defining an axis of rotation for the first and second indexing tables, respectively, relative to the stand component and the first and second table units, respectively, first and second combinations being formed of the first indexing table and first table unit and being formed of the second indexing table and the second table unit, respectively, the first and second combinations being selectively and releasably mounted on the stand component, the stand component including a circular cylindrical hollow body forming a rotary guide for the shaft and a foot part being flange-shaped and extending radially outwardly from an end of the circular cylindrical hollow body remote from the respective indexing table, the respective table unit with the respective clamp being placed stationary on the foot part; and a coaxial hollow cylinder adjoining the foot part of the stand component, the stand component and the coaxial hollow cylinder being within an outer housing of the first and second table units, respectively.

15. A changing device kit according to claim 14 wherein the foot part engages an inner collar of an inner housing part in the first and second outer housings, respectively.

16. A changing device kit according to claim 15 wherein the inner housing part of the first and second outer housings, respectively, surrounds the coaxial hollow cylinder.

17. A changing device kit according to claim 15 wherein the foot part extends axially between the inner collar of the first and second outer housings, respectively, and the coaxial hollow cylinder.

18. A changing device kit according to claim 14 wherein the coaxial hollow cylinder has a media supply port extending axially through a wall of the coaxial hollow cylinder.

* * * * *